United States Patent [19]

Zenbayashi et al.

[11] 4,334,943
[45] Jun. 15, 1982

[54] METHOD FOR SMOOTHLY EVAGINATING A TUBULAR MATERIAL UNDER PRESSURE

[75] Inventors: Katsuaki Zenbayashi; Akio Morinaga, both of Fujisawa; Masao Hirayama; Akira Morita, both of Settsu, all of Japan

[73] Assignees: Tokyo Gas Kabushiki Kaisha; Ashimori Kogyo Kabushiki Kaisha, both of Osaka, Japan

[21] Appl. No.: 173,656

[22] Filed: Jul. 29, 1980

[30] Foreign Application Priority Data

Jul. 30, 1979 [JP] Japan .................................. 54-97565
Jan. 23, 1980 [JP] Japan .................................. 55-7251

[51] Int. Cl.³ ....................... B29C 27/16; F16L 55/18
[52] U.S. Cl. ................................... 156/287; 156/294; 156/330; 156/332; 264/269; 264/516; 264/569
[58] Field of Search ............... 156/285, 286, 287, 294, 156/330, 332; 264/269, 516, 569

[56] References Cited

U.S. PATENT DOCUMENTS 2,794,758  6/1957  Harper et al. .................. 156/286
3,494,813  2/1970  Lawrence et al. ............... 156/294
3,560,295  2/1971  Kimbrell et al. ................ 156/294
4,064,211 12/1977  Wood ............................ 156/287
4,182,262  1/1980  Everson et al. ................. 156/294

FOREIGN PATENT DOCUMENTS 2600618   7/1976  Fed. Rep. of Germany ...... 156/294
55-93413  1/1979  Japan ............................ 156/294
55-15852  2/1980  Japan ............................ 156/294
957929   5/1964  United Kingdom ............. 156/294
2042673   9/1980  United Kingdom ............. 156/294
2060810   5/1981  United Kingdom ............. 156/294

OTHER PUBLICATIONS

Ohtsuga et al., "Method . . . Under Pressure" U.S. patent application Ser. No. 107,870 filed 12-28-79, pp. 1-63.

*Primary Examiner*—Jerome W. Massie
*Attorney, Agent, or Firm*—Birch, Stewart, Kolasch & Birch

[57] ABSTRACT

A method for smoothly evaginating a tubular material under pressure, if necessary, within a pipe line with simultaneous bonding the evaginated tubular material onto the inner surface of the pipe line, which comprises placing in a pressure container having a discharge pipe a part or whole of a tubular material, if necessary, with one terminal end thereof being connected to a first like material rope having a length at least equal to that of the tubular material, if necessary forming a reservoir of a binder enclosed in the interior of the tubular material placed in the pressure container to apply the binder onto the inner surface of the tubular material, fixing the other open terminal end in evaginated state to an annular fastener of said discharge pipe, and applying a pressurized fluid to the pressure container to evaginate the tubular material over its full length as it is propelled from the discharge pipe and, if necessary, moved forward within the pipe line and at the same time bonding the evaginated tubular material onto the inner surface of the pipe line with the binder being interposed therebetween, characterized in that a second rope-like material previously passed through said tubular lining material beyond its full length is drawn out while applying said pressurized fluid. This method is effective for overcoming drawbacks seen in the conventional methods for evaginating tubular materials and is advantageously utilized for the lining treatment of extremely long pipe lines or pipe lines with a number of curved portions without damaging the apparatus and/or lining materials and narrowing the flow path.

15 Claims, 18 Drawing Figures

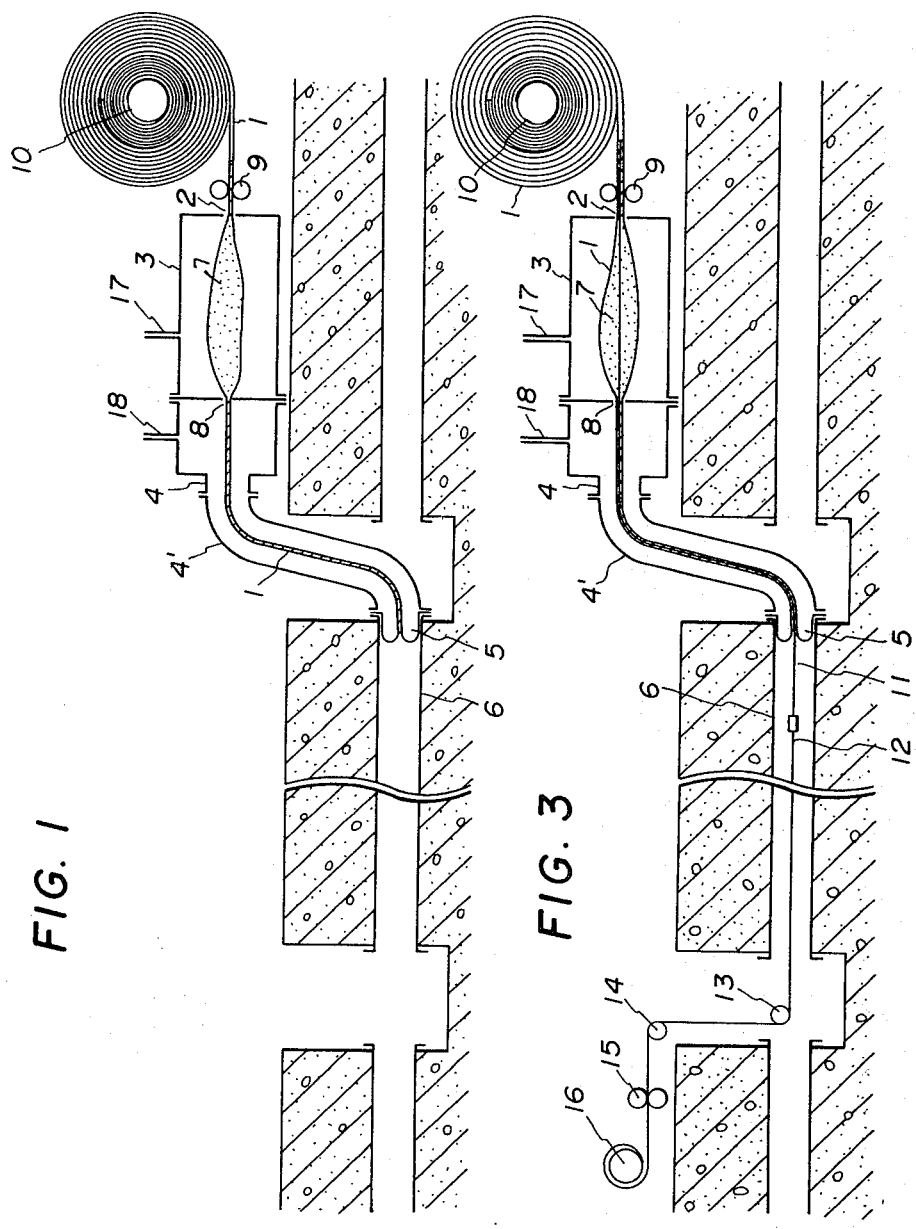

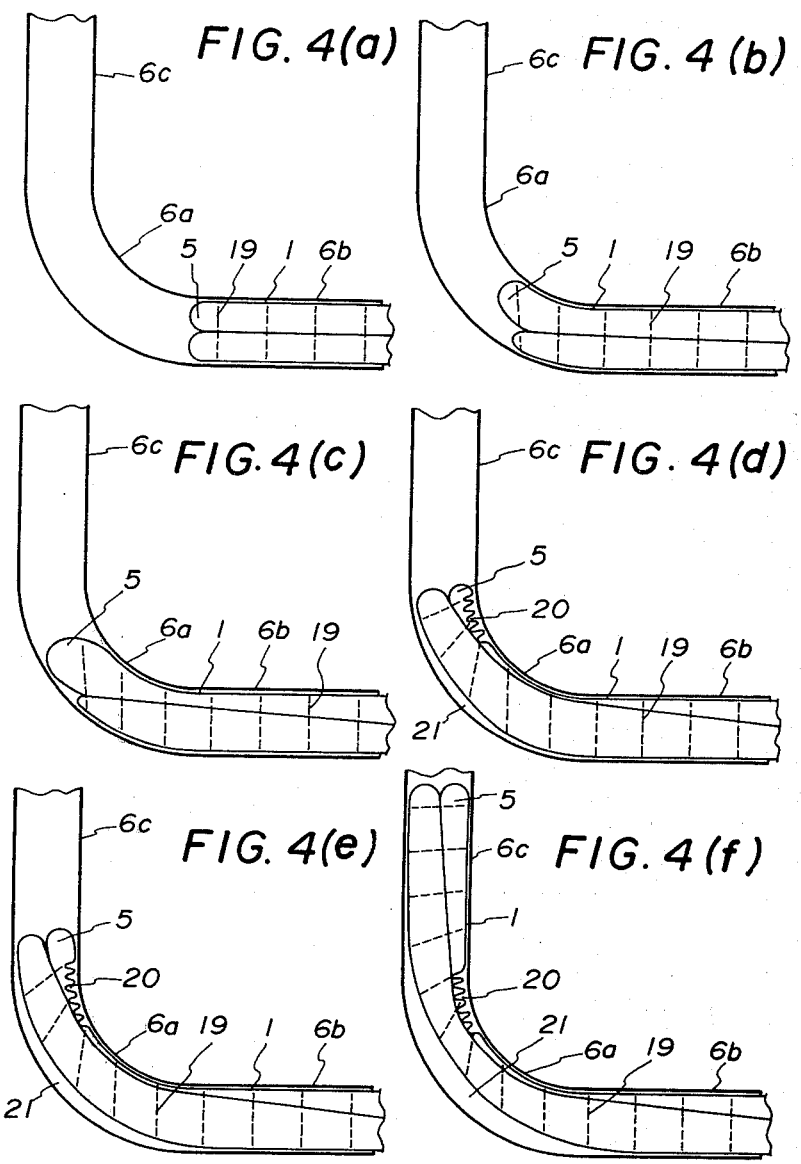

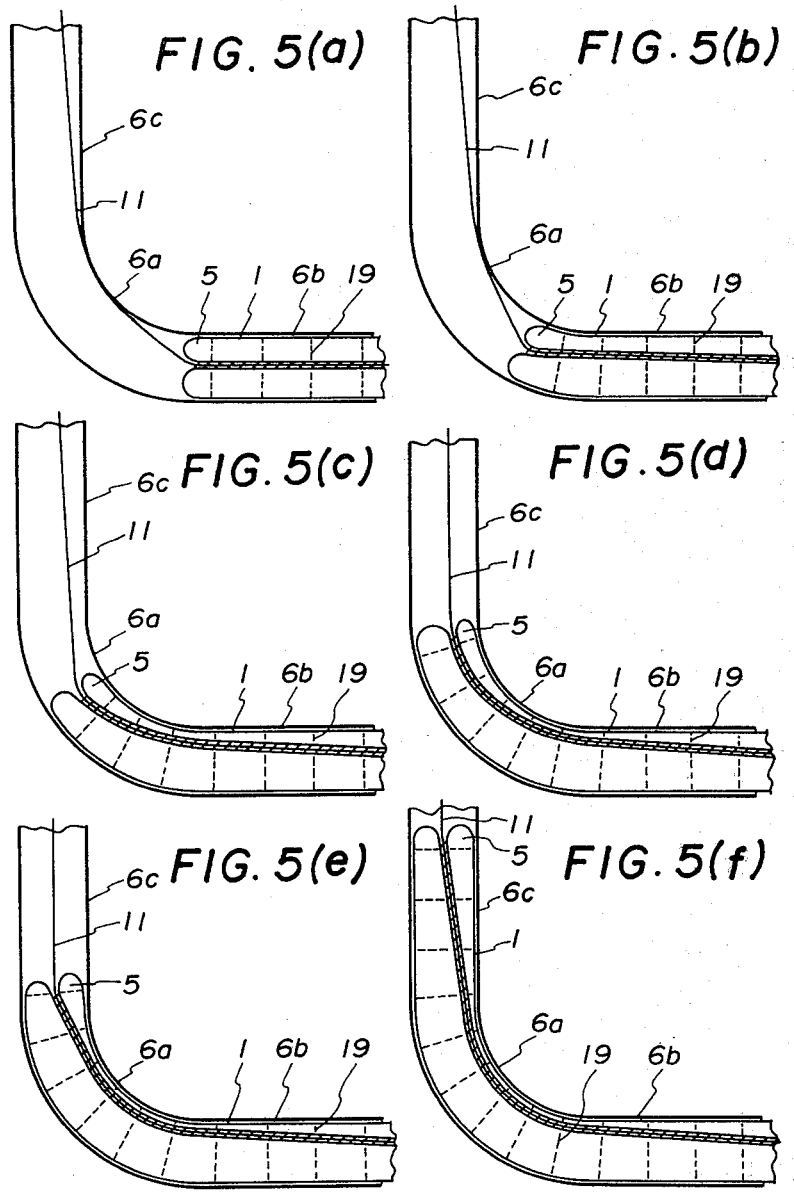

METHOD FOR SMOOTHLY EVAGINATING A TUBULAR MATERIAL UNDER PRESSURE

BACKGROUND OF THE INVENTION

1. Field of the Invention

The present invention relates to a method for smoothly evaginating a tubular material wherein a flexible tubular material is evaginated by drawing a rope passed through the tubular material from the outside while applying a fluid pressure to the portion of the tubular material placed in a pressure container to push out the tubular material from the container by inner fluid pressure. More particularly, the present invention relates to a method for smoothly evaginating a tubular lining material within pipe lines such as those made of steel or the like metal, concrete pipes or rigid resinous pipes, chiefly those already constructed and subjected to actual use, for example, underground pipelines such as gas conduits, city water pipes and pipes enclosing power transmission wires or telephone cables, and simultaneously bonding the evaginated lining material onto the inner surface of the pipe lines thereby reinforcing the pipe lines or repairing damaged portions thereof, wherein a tubular lining material is evaginated and at the same time bonded to the inner surface of the pipe lines by previously applying a binder onto the inner surface of the lining material, previously passing a rope through the lining material beyond its full length, and drawing the rope from the outside while applying a fluid pressure to the portion of the lining material placed in a pressure container to push forward the lining material within the pipe lines while undergoing evagination through a discharge pipe of the container by inner fluid pressure.

2. Description of the Prior Art

It is well known that a hose such as a fire hose with a lining of a rubber or a synthetic resin is manufacture by coating the external surface of a textile jacket made of woven or knitted fibers in a tubular form with a film of such rubber or resin and then evaginating the jacket. The methods disclosed in British Pat. No. 957,929 and U.S. Pat. No. 3,927,184 are involved in such practice, among which the latter method is most advantageous in that the operation is easy and simple. This method comprises fixing one end of an externally coated hose placed in a pressure container to an annular fastener of a nozzle and applying a fluid pressure to the container to effect evagination of the hose by inner pressure. When the hose is extremely long, however, a very high pressure is required to initiate evagination whereby fluctuation in evagination velocity occurs during the treatment, thus forming torsion in the resultant hose. In the extreme case, the hose is not evaginated and is damaged by the extremely high pressure.

On the other hand, it is known that superannuation or damage of underground pipe lines for gas or water often causes dangerous leakage of gas or water. Further, deteriorated pipes or casings enclosing power transmission wires or telephone cables permit intrusion of water or electroconductive substances and result in accidents caused by electric leakage. A sole effective coountermeasure from the past to prevent such troubles is that when such underground pipe lines are superannuated, the pipe lines are dug up over the length in the order of several ten or hundred meters and replaced with new ones. In this case, however, supply of city water or gas has to be discontinued until the pipe-exchange work has been finished. In case superannuated pipes are buried under public roads, people encounter a great deal of trouble and inconvenience since traffic on the roads is limited during the pipe-exchange work. It is a matter of course that much labor and cost are required for exchange of pipes in addition to the difficulty in the work itself. Furthermore, it is not rare that such pipe-exchange work cannot be utilized, depending on the particular situation of the place where such pipe lines are buried. Recently, the strong probability of severe earthquakes are geophysically predicted in many places in the world and consideration is being given to reinforcing underground pipes regardless of whether such pipes are superannuated or not to protect them from damage by earthquake. However, such pipe-exchange work on the underground pipe lines over the almost full length thereof is extremely difficult or rather impossible for both technical and economical reasons and is utterly ineffective for the purpose of reinforcing the pipe lines.

Under such circumstances, a primitive pipe-lining method wherein a flexible plastic tube is inserted into underground pipe lines and bonded to the inner surface thereof was proposed for attaining both purposes of reparing damaged portions of the pipe lines and reinforcing them so as to withstand mechanical shock. In such a method, however, the step for inserting the flexible tube into the underground pipe lines is extremely difficult so that the work is almost impossible to operate in such place where the pipes are long and/or curved. With a view to improving this primitive method, a new method for providing pipe lines with a lining material with evagination wherein a flexible tube is inserted into a pipe while turning the tube inside out by the action of a pressurized fluid, such as compressed air, and bonded at the same time onto the inner surface of the pipe by the aid of a binder, was developed and has been watched with interest in recent years. A method of this type is desclosed in U.S. Pat. Nos. 2,794,785, 3,132,062, 3,230,129 and 3,494,813 and British Pat. Nos. 1,002,131, 1,069,623 and 1,025,011 and is certainly advantageous in that insertion of the lining material and bonding of the material to the inner surface of the pipe are effected smoothly, at the same time.

Among these prior art approaches, British Pat. No. 1,002,131 relates to a method and device for evaginating a flexible tube but nowhere gives any description or suggestion on insertion of the tube into a pipe. British Pat. No. 1,025,011 discloses the means for inserting a tube into a pipe while turning the tube inside out. In this patent, however, the tube is not bonded to the inner surface of the pipe and no technique is disclosed for this purpose. U.S. Pat. Nos. 2,794,758, 3,132,062 and 3,494,813 and British Pat. No. 1,069,623 disclose respectively a method for inserting a tube into a pipe while turning the tube inside out and bonding the tube onto the inner surface of the pipe. However, all of these known approaches disclosed in these patents require the previous application of a binder onto the inner surface of a pipe or tube prior to insertion of the tube. Further, an ordinary binder containing a volatile component cannot be used for this purpose because both pipe and tube should be impervious. Accordingly, the use of a binder of the type that contains no volatile component and wherein the resinous component is curable only after the lapse of a long period of time comes into question in these methods. As a considerably longer period of time is required until such binder has completely been applied onto the inner surface of the pipe, curing of the binder already starts prior to the insertion of the tube into the pipe, thus resulting in insufficient adhesion of the lining material. The use of a binder having an extended pot life is thus required to prevent such premature curing and the time necessary for the lining treatment thus becomes inevitably long. U.S. Pat. No. 3,230,129 disclosed a method wherein the inside of a pipe is charged with a binder and a tube is inserted into the pipe from one end thereof while turning the tube inside out and pushing the binder forward thereby bonding the evaginated portion of the tube onto the inner surface of the pipe by the aid of the binder remaining on the inner surface. However, this method has also a number of drawbacks. First, the quantity and distribution of the binder cannot be controlled so that the binder is applied unevenly onto the inner surface of the pipe. Secondly, the binder must be used in an amount larger than that needed for bonding the tube to the pipe because the tube is allowed to proceed with simultaneous evagination within the pipe while pushing the binder forward. An excess amount of the binder is, after all, discarded. Thirdly, when the pipe is inclined, the head pressure of the binder acts on the top or turning point of the proceeding tube where evagination occurs, so that the pressure required for evagination of the tube fluctuates and the amount of the binder applied tends to vary. Thus, none of the prior art methods succeeded in providing pipes, especially those buried in the ground, with a lining material according to a simple operation conducted in situ without moving or disjoining the pipes.

In the above circumstances, the present inventors already have proposed with co-workers a new improved method for providing the inner surface of pipes with a tubular lining material (Japanese Laid-open Patent Appln. No. 55-91627) wherein the tubular lining material is inserted into the pipes while turning it inside out and applying at the same time a binder onto the inner surface of the lining material evenly and the lining material is bonded onto the inner surface of the pipes with the binder being interposed therebetween under pressure of a pumped fluid. According to this improved method, a number of disadvantages of the prior art methods could entirely be overcome by a series of specific treatments wherein a reservoir of a binder is formed in the interior of the unevaginated portion of a tubular lining material positioned in the rear of the fixed point of the lining material to a pipe and a fluid pressure is applied externally to the portion of the lining material where the reservoir is formed, thereby pushing the lining material forward under evagination within the pipe and squeezing the lining material at the same time to adjust the quantity of the binder applied onto the inner surface of the lining material. In a preferred embodiment shown in FIG. 6 of this improved method wherein an induction pipe is inserted between a pipe in the ground and a discharge pipe in front of the pressure container, the lining treatment for pipes in the ground is markedly facilitated since the size of a hole to be dug for accommodating the pressure evagination device and workers for handling it can be minimized and most of the apparatus can be left on the ground. Thus, this improved method is fundamentally an excellent method for applying a lining material onto the inner surface of a pipe line having a length in the order of several hundred meters and/or a number of curved portions. Because of easiness in operations for achieving a high efficiency of lining treatments, this improved method is indeed advantageous in providing the inner surface of a pipe line in the ground with a reinforcing lining material and is now being watched with high interest.

According to the present inventors' further study, however, it was found that when a pipe line to be lined is as long as one thousand meters or more or when the pipe line has a number of curved portions such as bends, elbows and/or offset bends, the fluid pressure required for evagination of a lining material should be high enough, especially in the final stage of the treatment, so that this method encounters a number of unexpected difficulties. For example, the pressure container for effecting evagination of the lining material under pressure should be made of a material resistant to high pressure to prevent danger of any bursting of the pressure container. When the evagination of a lining material is effected under high pressure, there is a fear of breakage of the lining material at the turning point where evagination takes place. Under high pressure, the lining material is bonded, while receiving strain corresponding to such high pressure, to the inner surface of the pipe, especially in curved portions. When the high pressure is reduced after completion of the lining treatment, a force eliminating such strain is acted on the curved portions where the bonded lining material is partially detached from the inner surface. In general, the lining material can be evaginated and at the same time bonded to the inner surface of the pipe under a relatively low fluid pressure at the initial stage of the lining treatment. At the middle and final stages of the treatment, however, a relatively high fluid pressure is required for evagination and bonding of the lining material. Such high fluid pressure is also required temporarily when the lining material is passed through curved portions of the pipe line. During the lining treatment, therefore, a considerable fluctuation of pressure is unavoidable which apparently results in reduction of the bonding force of the lining material due to its elongation or shrinkage caused by the fluctuation of pressure. Further, fluctuation of pressure causes fluctuation in the amount of a binder applied onto the inner surface of the lining material so that even bonding force of the lining material is not achieved. Even by the use of the improved method, the operation under high pressure causes a number of drawbacks, especially in the treatment of a pipe line having a very extended length and/or many curved portions. In the practical aspect, therefore, there is a great demand for making further improvement in the above method so that the operation may be conducted under a relatively low pressure even in the treatment of a pipe line having an extended length or abounding in curved portions.

BRIEF SUMMARY OF THE INVENTION

Accordingly, it is an object of the present invention to provide a new method for smoothly evaginating a tubular material under low pressure.

It is another object of the present invention to provide a method for smoothly evaginating a tubular lining material within pipe lines and simultaneously bonding the evaginated tubular lining material onto the inner surface of the pipe lines under low pressure.

It is still another object of the present invention to provide an improvement in a method for evaginating a tubular material under pressure, wherein the tubular material is evaginated by previously passing a rope through the tubular material beyond its full length and drawing the rope from the outside while applying a fluid pressure to the portion of the tubular material placed in a pressure container to push outward the tubular material while undergoing evagination through a nozzle of the pressure container by inner fluid pressure.

It is a further object of the present invention to provide a method for smoothly evaginating a tubular lining material within extremely long pipe lines having a number of curved portions and simultaneously bonding the evaginated tubular lining material onto the inner surface of the pipe lines under low pressure wherein a rope is previously passed through the tubular lining material and when the tubular lining material is pushed forward within the pipe lines from one end thereof by inner pressure, the rope is drawn from the opposite end of the pipe lines.

Other objects, features and advantages of the present invention will become apparent more fully from the following description.

DETAILED DESCRIPTION OF THE INVENTION

As a result of the present inventors' further study, it has now been found surprisingly that the above mentioned drawbacks of the present inventors' prior method can be overcome and the fluctuated high fluid pressure used therein can be reduced to a relatively low constant pressure by an improvement wherein a rope-like material is previously passed through a tubular lining material beyond the full length thereof prior to applying a binder evenly onto the inner surface of the lining material and, when the lining material is inserted into a pipe line from one end thereof and allowed to advance within the pipe line while effecting evagination of the lining material and simultaneous application of the binder onto the inner surface of the pipe line under fluid pressure, the rope-like material is drawn at a constant rate from the opposite end of the pipe line, thereby reducing the high fluid pressure necessary for the evagination and advancement of the lining material and controlling the evagination speed so as to prevent any locally uneven application of the lining material especially in curved portions of the pipe line.

The present invention can more fully be understood from the following description taken in conjunction with the accompanying drawings in which:

FIG. 1 is a schematic side section-view showing one mode of operation according to one of the preferred prior art methods (Japanese Laid-open Patent Appln. No. 55-91627).

FIG. 3 is a schematic side section-view showing still another mode of the operation according to the present invention using a pressure container similar to that used in FIG. 1.

Figure 2A:
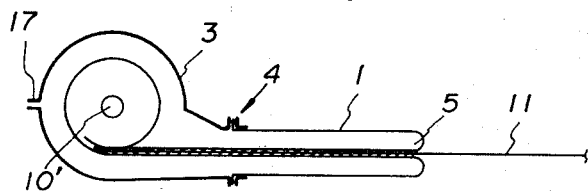
FIG. 2(a) is a schematic diagram showing one mode of the operation according to the present invention using a prior art pressure container disclosed in Japanese Pat. No. 472,047.

FIGS. 4(a)–4(f) are a series of schematic diagrams each showing the state of evagination of a tubular lining material in a bend of a pipe line according to the method of Japanese Laid-open Patent Appln. No. 55-91627.

FIGS. 5(a)–5(f) are a series of schematic diagrams each showing the state of evagination of a tubular lining material in a bend of a pipe line according to the present invention.

In FIG. 1 showing one of the most preferable examples of the prior art evagination method, a flexible tubular lining material 1 in a flattened state is passed through a pressure container 3 and a front end of the lining material is fixed to an annular fastener in front of an induction pipe 4' connected to a flange 4 of the pressure container. The flexible tubular lining material 1 in a flattened state is wound on a reel and a rear end of the material 1 is connected to a rope or belt 10 having a length at least equal to that of the lining material 1. In the pressure container 3, the lining material 1 is previously charged in the interior thereof with a liquid or viscous binder to form a reservoir 7 of the binder. The pressure container 3 is divided into two chambers, the front chamber and the rear chamber. The front chamber is provided with an inlet 18 for a pressurized fluid and partitioned from the rear chamber by a bulkhead provided with a slit 8 which serves to adjust the quantity of the binder to be applied onto the inner surface of the lining material 1. The rear chamber has an inlet 17 for pressurized fluid and the rear end of the chamber is provided with a slit 2 through which the lining material is supplied.

In an actual operation, a pressurized fluid such as compressed air is introduced from a pressure supply device (not shown) to the pressure container 3 through the inlets 17 and 18 whereby the inner pressure of the rear chamber is usually kept almost equal to that of the front chamber. When the fluid pressure is applied to the pressure container 3, the tubular lining material 1, the front end of which has been fixed in an evaginated state to the annular fastener in front of the induction pipe 4', is pushed forward within a pipe line 6 while undergoing evagination whereby the front end of the advancing lining material 1 forming a turning point 5 where evagination of the lining material starts is also allowed to advance correspondingly with the pipe line 6. The binder applied first onto the inner surface of the lining material 1 is positioned on the outer surface by evagination at the turning point 5 and is interposed, as the lining material is pushed forward, between the inner surface of the pipe line 6 and the evaginated lining material 1 to fix them firmly. An evagination velocity controlling device 9 comprised usually of a pair of rolls driven by a motor is inserted between the reel and the pressure container 3 to control the evagination velocity lest too rapid evagination and advance should occur. After supply of the lining material 1 to the device 9 has been finished, the rope or belt 10 is successively supplied to the device 9 so that the length of the rope or belt 10 should be at least equal to that of the lining material 1 to be applied onto the inner surface of the pipe line 6 over its full length.

According to this prior art method, the fluid pressure required for the evagination can be kept relatively low so far as the pipe line to be treated has a length as long as several hundred meters or has a small number of curved portions. However, a high fluid pressure is often required at the middle and final stages of the treatment.

Further, when the pipe line is extremely long or has a number of curved portions, the fluid pressure should be raised to complete the lining treatment. As described above, this method is attended with a number of disadvantages, e.g. unsatisfactory bonding of the lining material in curved portions of the pipe line and possibility of destruction of the pressure container or the lining material at the turning point, when the fluid pressure is too high. Accordingly, there is need for improvement in this prior art method for reducing the high fluid pressure required to effect the lining treatment of an extremely long pipe line having a number of curved portions.

The method of the present invention is characterized by previously passing a rope-like material through a tubular lining material beyond its full length and drawing the rope-like material from the opposite end of the pipe line while applying fluid pressure to the lining material in rear of the annularly fastened portion thereof whereby the lining material is allowed to advance within the pipe line while undergoing evagination at the turning point and is attached onto the inner surface of the pipe line under relatively weak pressure. According to the present invention, the force required for evagination of the lining material is largely distributed to the force for drawing the rope-like material from the opposite end of the pipe line. Thus, the fluid pressure applied internally to the turning point may be so weak that the already evaginated portion of the lining material may be attached to the inner surface of the pipe line.

The apparatus used in the method of the present invention may be any of the known conventional apparatus utilizing evagination of a tubular material under pressure, for example, one disclosed in Japanese Pat. No. 472,047 (U.S. Pat. No. 3,927,164) or Japanese Laid-open Patent Appln. No. 55-91627. However, the use of the apparatus shown in FIG. 6 of Japanese Laid-open Patent Appln. No. 55-91627 is most preferred for the lining treatment of pipe lines, because the operations for the lining treatment of underground pipe lines are easy and simple. Anyway, the drawbacks found in these prior art methods for evagination of a tubular material such as a hose or for lining underground pipe lines having a number of curved portions can be overcome by the improvement according to the present invention.

In FIG. 2(a) showing an apparatus for evagination of a tubular material such as a hose, a pressure container 3 is provided with an inlet 17 for a pressurized fluid and charged with a reel 10' on which a tubular material 1 in flattened state is wound. A rope-like material in the form of a belt 11 is previously passed through the tubular material 1 beyond its full length. The tubular material 1 is fixed at the front end to an annular fastener 4 mounted to the front end of the pressure container 3. When a pressurized fluid is introduced into the container 3 through the inlet 17, the tubular material 1 is allowed to advance by the internal pressure and at the same time evaginated at the turning point 5 which forms the front end of the advancing tubular material 1. By drawing the rope 11 from the opposite end in the direction of advancing tubular material, the pressure applied to the container 3 can be reduced significantly so that the evagination of the tubular material 1 can be effected easily without damaging it. Using the apparatus shown in FIG. 2(a), the method of the present invention can be utilized, in addition to the inherent purpose of evaginating a tubular material, such as a hose, for the purpose of lining a pipe line. In this case, a tubular lining material and a rope (or belt) 10 which may be the same or different in material from the rope 11 are wound on the reel 10' in such manner that the lining material comes first. The lining material is previously charged with an adequate amount of a liquid or viscous binder and the rope 10 should have a length at least equal to that of the lining material. In these cases, evagination of a tubular material 1 is attained by merely drawing the rope 11 simultaneously with application of a weak pressure to the pressure container 3.

Figure 2B:
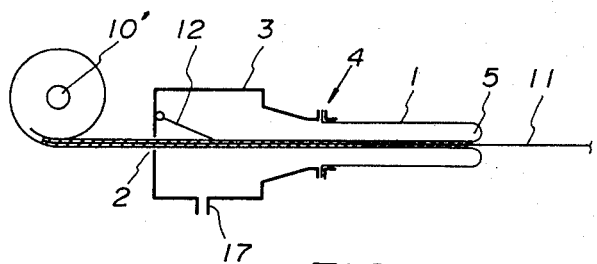
FIG. 2(b) is a schematic diagram showing another mode of the operations according to the present invention using a pressure container disclosed in Japanese Laid-open Patent Appln. No. 55-91627.

In FIG. 2(b) showing another example of the apparatus for evagination of a tubular material such as a hose, the same reel 10' as in the case of FIG. 2(a) is placed outside the pressure container 3 and the front end of a tubular material 1 is passed though the container 3 and fixed in evaginated state to an annular fastener 4 mounted to the front end of the container 3. As the reel is outside the container 3, handling of the tubular material is convenient in this example. A rope (or belt) 11 is previously passed through the tubular material 1 beyond its full length. The pressure container 3 is provided with an inlet 17 for a pressurized fluid, a slit 2 through which the tubular material 1 is supplied, and a stopper 12 which functions as a sealing panel when the tubular material 1 has completely been supplied into the container 3. In this example, evagination of the tubular material 1 can be attained easily by merely drawing the rope 11 simultaneously with application of a weak pressure to the pressure container 3. This example is particularly advantageous for the treatment of an extremely long tubular material, since there is no necessity of increasing the capacity of the pressure container 3 regardless of increasing the length of the tubular material 1. Using the apparatus of this example, the method of the present invention can also be utilized for the lining treatment of underground pipe lines, for example, by replacing the reel 10' with a different one on which a tubular lining material previously charged with a binder and a rope (or belt) which may be the same or different material from the rope 11 have been wound in such manner that the lining material reels off first or by forming a reservoir of a binder within the tubular lining material in any position between the reel 10' and the slit 2.

Figure 2C:
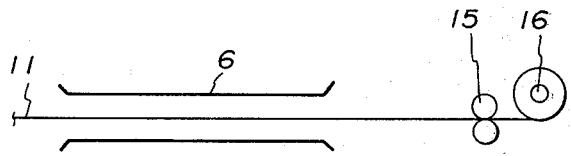
FIG. 2(c) is a schematic diagram showing a drawing device and a take-up reel for drawing a rope-like material passed through a pipe.

In FIG. 2(c) showing one example of the ordinary rope-winding devices, the rope (or belt) 11 is wound on a take-up reel 16 by means of a pair of drawing rolls 15 driven by a motor. The drawing force is controlled by the rotation velocity of the rolls 15. In case a tubular material such as a hose is evaginated, a pipe line 6 is unnecessary but in case of using a lining material the pipe line 6 is interposed between the pressure container 3 and the drawing rolls 15. This drawing device can be used commonly to the apparatus shown in FIGS. 2(a) and 2(b), especially when the length of the tubular material 1 to be evaginated is short.

Figure 2D:
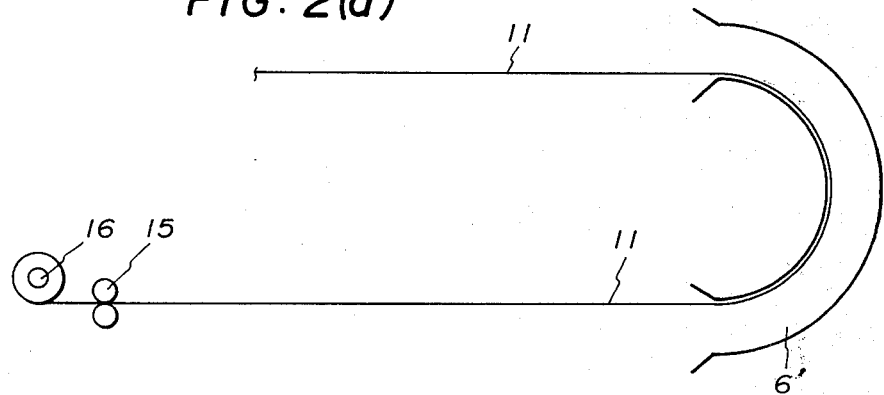
FIG. 2(d) is a schematic diagram showing a drawing device and a take-up reel for drawing a rope-like material passed through a pipe.

In FIG. 2(d) showing another example of the ordinary rope-winding devices, the rope (or belt) 11 is passed through a curved pipe 6' and then wound on a take-up reel 16 by means of a pair of drawing rolls 15 driven by a motor. In this case, the drawing force is controlled by adjusting the rotation speed of the rolls 15. This drawing device can be used commonly to the apparatus shown in FIGS. 2(a) and 2(b), especially when the length of the tubular material 1 is extremely long. The use of the curved pipe 6' is advantageous to make the working space, especially the length thereof, smaller when the tubular material 1 is extremely long. A plurality of the curved pipes 6' may be used as the case may be.

Any combination of the apparatus shown in FIG. 2(a) or 2(b) with the drawing device 2(c) or 2(d) can be used in the present invention to effect evagination of a tubular material such as a hose smoothly.

In FIG. 3, the pressure container 3 and its accessaries are identical with those shown in FIG. 1 except that a rope (or belt) 11 is previously passed through the tubular lining material 1 beyond its full length. The rope 11 is preferably in the form of a flat belt in conformity with the shape of the tubular lining material 1 in flattened state, but any of the flexible rope-like materials such as rope itself, cord, belt and wire can be used equivalently for this purpose. The rear end of the tubular lining material 1 is connected to a separate and distinct rope (or belt) 10 and both lining material 1 and rope 10 are wound on a reel outside the pressure container 3 in such manner that the lining material 1 reels off first. The rope 10 should have a length at least equal to that of the lining material 1 and may be the same material as the rope 11, if desired. Another rope-like material 12 is also previously passed through the pipe line 6 according to any of the adequate manners and is connected at one end to the rope 11. The other end of the rope-like material 12 is passed through guide rolls 13 and 14 and a drawing device 15 usually consisting of a pair of rolls driven by a motor and finally wound on a take-up reel 16.

Using the apparatus shown in FIG. 3, the pipe-lining treatment according to the method of the present invention is carried out as follows: The front end of the tubular lining material 1 in flattened state is passed through a driving device 9 also functioning as an evagination velocity controlling device and then through a slit 2 and inserted into the pressure container 3 where the lining material 1 is charged with a binder to form a reservoir 7. The front end of the tubular lining material 1 is again flattened and passed through a slit 8, a flange 4 and an induction pipe 4'. The rope 11 extending from the front end of the tubular lining material 1 is connected within the pipe line 6 to the rope-like material 12 previously passed through the pipe line 6. The rope 11 and the rope-like material 12 can be connected at any place, for example, at the front end of the induction pipe 4'. The front end of the tubular lining material 1 is fixed in evaginated state to an annular fastener at the front end of the induction pipe 4'. A pressurized fluid is then introduced into the pressure container 3 through inlets 17 and 18. The fluid is desirably kept under a pressure sufficient enough to attach the evaginated tubular lining material 1 onto the inner surface of the pipe line 6. Thus, the pressure should not be so strong as to evaginate the lining material 1 positively. The drawing device 15 is operated under such condition and the driving device 9 is then operated. In the present invention, the tubular lining material 1 is turned inside out by the advancing movement of the rope 11. If the tension of the ropes 11 and 12 in the portion from the drawing device 15 to the turning point 5 where evagination of the lining material 1 occurs is lowered, the lining material 1 runs on the rope 11 in such manner that the rope 11 is interposed between the inner surface of the pipe line 6 and the evaginated tubular lining material 1, whereby evagination can no longer be made. To prevent such trouble, the drawing device 15 is first operated and the driving device 9 is then operated after the tension of the ropes 11 and 12 has been transmitted to the device 9. The operation of both devices is controlled in such manner that the drawing device 15 is operated slightly faster than the driving device 9 so that the ropes 11 and 12 may be maintained under a moderated tension. As the driving device 9 also functions as an evagination velocity controlling device for preventing any excessively rapid evagination, it is not necessary to operate the device 9 positively. The device 15 is rather operated positively with the device 9 being operated by the fowarding movement of the lining material 1 and exerting merely as a braking action. When the drawing device 15 is operated, the rope 11 connected to the rope 12 is also allowed to advance (i.e. drawn leftward in FIG. 3) whereby the tubular lining material 1 which is attached in flattened state to the rope 11 under fluid pressure is also conveyed leftward in FIG. 3 together with the rope 11. This movement is supported by the driving device 9. Thus, the tubular lining material 1 moves forward within the pipe line 6 while being evaginated at the turning point 5. The evaginated tubular lining material 1 is then attached to the inner surface of the pipe line 6 under fluid pressure and bonded thereto by the aid of the binder.

The tubular lining material 1 wound on a reel in rear of the pressure container 3 is continuously reeled off by the action of the driving device 9 and supplied to the container 3 through the slit 2. In the pressure container 3, the binder is applied in the reservoir 7 onto the inner surface of the tubular lining material 1 and the amount of the binder is adjusted when the lining material 1 is passed through the slit 8. The tubular lining material 1 is then passed together with the rope 11 drawn leftward in the figure through the container 3, the induction pipe 4' and the pipe line 6 and evaginated at the turning point 5 by the action of the drawing device 15. The ropes 11 and 12 drawn by the device 15 are wound on the reel 16. When the tubular lining material 1 has wholly been supplied, the rope 10 is then supplied and passed through the device 9 to control the evagination velocity of the tubular lining material 1. The lining treatment is finished by stopping the actions of the devices 9 and 15 at the stage that the pipe line 6 is lined over its full length with the tubular lining material 1 and the turning point 5 is passed through the opposite end (the left end in the figure) of the pipe line 6. According to the method of the present invention wherein evagination of the tubular lining material is effected chiefly by the drawing force of the ropes 11 and 12 under a low fluid pressure, no fluctuation of pressure occurs during the lining treatment and there is no fear of bursting in the pressure container even when the pipe line to be lined is extremely long or abounds in curved portions. Thus, the evaginated tubular lining material is bonded without receiving any strain onto the inner surface of the pipe line.

The method of the present invention is effective not only for facilitating the evagination treatment of a tubular material under a low fluid pressure but also for eliminating shortcomings in the prior art methods as seen in the case of passing the tubular lining material through curved portions, e.g. bends, elbows or offset bends, of pipe lines. The tubular lining material could not be applied satisfactorily onto the inner surface of pipe lines in curved portions by any of the known conventional methods. According to the method of the present invention, however, the tubular lining material can be evaginated very smoothly even in the curved portions to give a satisfactory lining on the inner surface of pipe lines. The technical merits of the present invention in this respect are obvious from comparison of FIGS. 4(a)-4(f) with FIGS. 5(a)-5(f).

In FIGS. 4(a)-4(f) showing the state of evagination of the tubular lining material at every stage in passing the material through a bend of a pipe line, the bend 6a has straight portions 6b and 6c just before and after the portion 6a. A vertical dotted line 19 is arbitrarily depicted at a definite interval along the periphery of the tubular lining material for better understanding of the state of evagination of the material in the bend.

In FIG. 4(a) showing the state of evagination just before the bend, the turning point 5 where evagination of the material 1 occurs proceeds leftward within the straight portion 6b of the pipe as shown in the figure. This is a normal state of evagination of the material 1 within pipe lines.

In FIG. 4(b) showing the initial stage of passing through the bend 6a, the lower part of the lining material 1 at the turning point 5 bumps against the curved inner wall of the bend 6a whereby the head portion of the lining material 1 at the turning point 5 is deformed in such manner that the lower part becomes smaller but the upper part begins to expand.

In FIG. 4(c) showing the former half of the middle stage, evagination of the tubular lining material 1 proceeds in the state as shown in FIG. 4(b). The lower part of the lining material is strongly pressed between the curved inner wall of the bend 6a and the upper part of the lining material and is scarcely evaginated. On the other hand, the upper part of the lining material alone is evaginated to expand largely within the bend 6a. At this stage, evagination of the tubular lining material is almost stopped unless the fluid pressure be raised. When the fluid pressure is raised in such state, the upper part of the lining material at the turning point 5 is expanded strongly so that the situation becomes serious. Thus, evagination of the tubular lining material can coercively be continued by raising the fluid pressure further. In this case, however, there is a fear of breakage of the lining material in the expanded portion.

In FIG. 4(d) showing the latter half of the middle stage, the direction of the advancing lining material 1 turns upward whereby the vertical direction of the dotted line 19 is rapidly changed to the horizontal direction. As soon as the direction of the advanced lining material 1 becomes upward, the smaller lower part of the lining material becomes larger so that the expanded upper part of the lining material is strongly pressed on the curved inner wall of the bend 6a to form a number of wrinkles 20 at the end of the bend 6a. On the other hand, the lower part of the lining material 1 is allowed to ascend rapidly under a high fluid pressure so that the outer surface of the evaginated lining material can no longer be kept in good compliance with the inner surface along the outer curvature of the bend 6a to form a space 21 between the inner surface along the outer curvature of the bend 6a and the curved lining material.

In FIG. 4(e) showing the final stage of passing through the bend 6a, the tendency shown in FIG. 4(d) become strong so that the space 21 becomes larger. At the end of curvature, the tubular lining material is again kept in good compliance with the inner surface of the pipe line.

In FIG. 4(f) showing the state of evagination after passing through the bend 6a, evagination of the tubular lining material is again effected normally. However, the wrinkles 20 and the space 21 no longer disappear even after application of a higher fluid pressure into the lining material 1. According to the prior art method, the flow path is thus narrower in the bend 6a of the pipe line.

According to the method of the present invention wherein the direction of the advancing lining material is gradually changed in the bend 6a by the induction of the rope 11, no strain is locally formed in the lining material so that there is no fear of forming wrinkles and spaces as seen in the prior art method. FIGS. 5(a)-5(f) show the state of evagination of the tubular lining material according to the present invention at the stages each corresponding to FIGS. 4(a)-4(f). For example, FIG. 5(a) corresponds to FIG. 4(a) and FIG. 5(c) corresponds to FIG. 4(c).

In FIG. 5(a) showing the state of evagination just before the bend 6a, the tubular lining material 1 is moved forward (leftward in the figure) by the drawing force of the rope 11. Although the state of advancing lining material is normal, the rope 11 does not pass through the center of the pipe line in the bend 6a but traces the shortest distance between the drawing device and the turning point 5, while contacting with the inner surface of the bend 6a along the inner curvature.

In FIG. 5(b) showing the initial stage of passing through the bend 6a, the tubular lining material 1 is drawn by the rope 11 in the left-upward direction (in the figure) from the turning point 5 so that the upper part of the lining material 1 is more or less compressed at the point 5 but the lower part is somwhat expanded. Thus, the evagination proceeds in such manner that the lower part slightly advances.

In FIG. 5(c) showing the former half of the middle stage, evagination of the tubular lining material is gradually effected in such manner that the vertical dotted line 19 is always orthogonal to the rope 11. Thus, the situation that the evagination is impossible as shown in FIG. 4(c) is avoided in the present invention. As the evagination proceeds, the vertical direction of the dotted line 19 is gradually changed to the horizontal direction. Both upper and lower parts of the lining material proceed under evagination while being kept in good compliance with the inner surface of the bend 6a.

In FIG. 5(d) showing the latter half of the middle stage, no particular difference appears in the mode of evagination except that the position of the rope 11 is gradually shifted to the center of the pipe line. As the position of the rope 11 is shifted to the center, the evagination at the turning point 5 is more facilitated.

In FIG. 5(e) showing the final stage of passing through the bend 6a, evagination of the tubular lining material 1 proceeds smoothly so that no strain is formed in the evaginated and bonded lining material. It is certain that as in the prior method, the portion of the lining material in contact with the inner surface of the bend 6a along the inner curvature becomes baggy at this stage. Such baggy portion is distributed to all areas of the bend 6a in the present invention, thus resulting in no trouble in the lining treatment of pipe lines having a number of curved portions.

In FIG. 5(f) showing the state of evagination after passing through the bend 6a, evagination of the tubular lining material is continuously effected normally. Thus, the flow path does not become narrower over the full length of the pipe line.

The lining material 1 used in the present invention is flexible and impervious and is in the form of a tube. Any of the known materials used for lining pipe lines can be used in the present invention. Typical examples of such lining material include a tubular textile jacket of a synthetic fiber of polyester series knitted in a tubular form which has been coated on its outer surface with a polyester elastomer, such as hose material. The textile material may be made of various fibrous materials such as cotton, polyamide, polyester, polyether or inorganic fibers such as glass fiber or carbonaceous fiber. The polyester elastomer is a block copolymer of an aromatic polyester and an aliphatic polyetherdiol and is regarded as a thermoplastic synthetic resin which is flexible and gas-impervious and is excellent in rubbery elasticity, moldability, heat-resistance, weather-resistance, water-resistance, oil-resistance, chemical-resistance and abrasion-resistance.

The binder used in the present invention should preferably be non-volatile, i.e. free from any volatile matter such as solvents or moisture. The use of a non-solvent, self-curable binder at ordinary or elevated temperature is desirable in the present invention. A binder of epoxy type, acrylic type or polyester type is preferable.

The method of the present invention is operable also with a pressure container in which a reel on which the tubular lining material and the rope have been wound is accommodated, for example, the apparatus as shown in FIG. 2(a). Although the mode of applying a binder simultaneously with the lining material onto the inner surface of pipe lines is illustrated herein, it is also possible in the method of the present invention to apply the binder previously onto the inner surface of pipe lines or the lining material prior to application of the lining material onto the inner surface of pipe lines.

The technical merits of the present invention is obvious from the following comparative experiments wherein the pipe-lining treatment is carried out according to the prior method and the method of the present invention, using a pipe line having a diameter of 156 mm and a total length of about 86 m interrupted with two 90° bends, six 45° bends and one 45° offset bend. In both methods was used as a tubular lining material tubular textile jacket of 148 mm Φ (outer) having on its outer surface a film of polyester elastomer (Hytrel, DuPont) with a thickness of at least 0.3 mm and knitted with 480 warps of 2000 denier polyester filaments and 78 wefts inserted at an interval of 10 cm which were made of twisted 10 polyester spinning threads (yarn number: 22S). The lining treatment was carried out first according to the prior method at a velocity of 8 m/min at the driving device, whereby evagination of the material in the straight portion of the pipe line was effected under a pressure of 0.7–0.8 kg/cm$^2$ but evagination of the material in the bends and offset bend required a pressure of 2.5–3.0 kg/cm$^2$. After completion of the lining treatment, the pipe line was disjoined to investigate the state of lining, whereby it was found that spaces having a width of about ¼–⅓ of the inner diameter of the pipe line were formed in the bends and a space having a width of about ⅔ of the inner diameter of the pipe line was formed in the offset bend. Thus, the flow path was extremely narrowed.

The lining treatment was then carried out according to the method of the present invention at a velocity of 8 m/min at the driving device and at a drawing velocity of 8.2–9.0 m/min under a belt tension of 210–350 kg, whereby the fluid pressure was substantially unchanged and kept under 0.7–0.75 kg/cm$^2$. The belt tension was more or less increased when the lining material was passed through the bends and the offset bend, but there was no necessity to change the fluid pressure. After completion of the lining treatment, the pipe line was disjoined to investigate the state of lining, whereby it was found that the tubular lining material was tightly applied to the inner surface of the pipe line and no space was formed in the bends and the offset bend. Thus, the flow path was completely secured.

As is evident from the above comparative experiments, the technical merits of the present invention are indeed remarkable and cannot be achieved by any of the prior art methods.

The method of the present invention is not limited to the use for repairing or reinforcing the pipe lines already constructed by providing them with a lining material, but is also utilizable for previously providing new pipes with a lining material. The method of the present invention can also be utilized for applying a resinous material onto the inner surface of pipe lines. In this case, the tubular lining material is peeled off and removed from the pipe lines by continuing to draw the rope 11 after the resinous material has been applied onto the inner surface of the pipe lines.

As many apparently widely different embodiments of the present invention may be made without departing from the spirit and scope thereof, it is to be construed that the present invention is not limited to the specific embodiments thereof except as defined in the appended claims.

What is claimed is:

1. A method for smoothly evaginating a tubular material under pressure which comprises placing in a pressure container having a discharge pipe a part or whole of a tubular material, fixing one lead end thereof in an evaginated state to an annular fastener of said discharge pipe and applying a pressurized fluid to said pressure container to evaginate said tubular material over its full length as it is propelled from said discharge pipe, characterized in that a rope-like material attached to the other end and previously passed through said tubular material beyond its full length is drawn out from said discharge pipe while applying said pressurized fluid.

2. A method according to claim 1, wherein the whole tubular material is wound on a reel and placed in said pressure container.

3. A method according to claim 1, wherein the whole tubular material wound on a reel is placed outside said pressure container and the lead end of said tubular material is reeled off and inserted into said pressure container through a slit.

4. A method according to claim 1, wherein said tubular material is drawn out under evagination from said pressure container through a pipe line.

5. A method according to claim 1, wherein said pressurized fluid is selected from air and water.

6. A method according to claim 1, wherein said tubular material is made of woven or knitted natural, synthetic or inorganic fiber and has a coating of a natural or synthetic resinous material on the outer surface thereof.

7. A method according to claim 1, wherein said rope-like material is in the form of a belt.

8. A method for smoothly evaginating a tubular lining material within a pipe line and at the same time bonding the evaginated tubular lining material onto the inner surface of said pipe line under pressure, which comprises placing in a pressure container having a discharge pipe a part or whole of a tubular lining material with one terminal end thereof being connected to a first rope-like material having a length at least equal to that of said tubular lining material and the other terminal end thereof being opened, forming a reservoir of a binder enclosed in the interior of said tubular lining material placed in said pressure container to apply said binder onto the inner surface of said tubular lining material, fixing said other leading terminal end in evaginated state to an annular fastener of said discharge pipe, and applying a pressurized fluid to said pressure container to evaginate said tubular lining material over its full length as it is propelled from said discharge pipe and moved forward within said pipe line and at the same time bonding the evaginated tubular lining material onto the inner surface of said pipe line with said binder being interposed therebetween, characterized in that a second rope-like material attached to the same terminal end of the tubular lining material as the first rope-like material and previously passed through said tubular lining material beyond its full length is drawn from the opposite end of said pipe line while applying said pressureized fluid into said pipe line through said discharge pipe.

9. A method according to claim 8, wherein the whole tubular material and said first rope-like material are wound on a reel and placed outside said pressure container and said leading terminal end of said tubular lining material is reeled off and inserted into said pressure container through a slit.

10. A method according to claim 8, wherein said tubular material is made of woven or knitted natural, synthetic or inorganic fiber and has a coating of a natural or synthetic resinous material on the outer surface thereof.

11. A method according to claim 8, wherein said second rope-like material is in the form of a belt.

12. A method according to claim 8, wherein said first rope-like material is the same as said second rope-like material.

13. A method according to claim 8, wherein said binder is selected from non-volatile, self-curable epoxy, acrylic and polyester type binders.

14. A method according to claim 8, wherein said pressurized fluid is selected from air and water.

15. A method according to claim 8, wherein the pressure of said pressurized fluid is kept constant during the lining treatment.

* * * * *

UNITED STATES PATENT AND TRADEMARK OFFICE
CERTIFICATE OF CORRECTION

PATENT NO. : 4,334,943
DATED : June 15, 1982
INVENTOR(S) : Zenbayashi et al

It is certified that error appears in the above—identified patent and that said Letters Patent is hereby corrected as shown below:

On the title page:

In the category "[75] Inventors", change "Katsuaki Zenbayashi; Akio Morinaga, both of Fujisawa; Masao Hirayama; Akira Morita, both of Settsu, all of Japan" to -- Akio Morinaga, of Kanagawa-ken; Akira Morita, of Osaka-fu, both of Japan.

In the category "[73] Assignees", change "Tokyo Gas Kabushiki Kaisha; Ashimori Kogyo Kabushiki Kaisha, both of Osaka, Japan" to -- Tokyo Gas Kabushiki Kaisha of Tokyo, Japan; Ashimori Kogyo Kabushiki Kaisha of Osaka, Japan.

Signed and Sealed this

Ninth Day of August 1983

[SEAL]

Attest:

Attesting Officer

GERALD J. MOSSINGHOFF

Commissioner of Patents and Trademarks